(12) United States Patent
Mahale et al.

(10) Patent No.: US 8,994,292 B2
(45) Date of Patent: Mar. 31, 2015

(54) ADAPTIVE LIGHTING SYSTEM

(75) Inventors: Milind Mahale, Stuttgart (DE); Oliver Stefani, Stuttgart (DE); Matthias Bues, Stuttgart (DE); Achim Pross, Stuttgart (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 335 days.

(21) Appl. No.: 13/307,062

(22) Filed: Nov. 30, 2011

(65) Prior Publication Data

US 2013/0134902 A1 May 30, 2013

(51) Int. Cl.
*G05F 1/00* (2006.01)
*H05B 37/02* (2006.01)

(52) U.S. Cl.
CPC ................................ *H05B 37/0227* (2013.01)
USPC .......................................... 315/307; 315/291

(58) Field of Classification Search
CPC ........... H05B 33/0815; H05B 33/0851; H05B 37/02; H05B 33/0818; H05B 33/0854; H05B 37/0227; H05B 37/0254; H05B 39/045; H05B 41/2928
USPC ................. 315/297, 130, 153, 291, 246, 299, 315/307–308, 293
See application file for complete search history.

(56) References Cited

U.S. PATENT DOCUMENTS

| | | | | |
|---|---|---|---|---|
| 6,963,175 B2 * | 11/2005 | Archenhold et al. | ......... | 315/291 |
| 8,183,785 B2 * | 5/2012 | Boleko Ribas et al. | ....... | 315/149 |
| 2006/0071605 A1 * | 4/2006 | Diederiks | ........................ | 315/76 |
| 2010/0235309 A1 * | 9/2010 | Boleko Ribas et al. | ......... | 706/13 |
| 2011/0109746 A1 * | 5/2011 | Schofield et al. | ............. | 348/148 |
| 2012/0181934 A1 * | 7/2012 | Knibbe et al. | ................ | 315/130 |
| 2012/0206050 A1 * | 8/2012 | Spero | ............................ | 315/152 |
| 2012/0319588 A1 * | 12/2012 | Sid | ................................. | 315/129 |
| 2013/0119891 A1 * | 5/2013 | Herremans et al. | ........... | 315/293 |

* cited by examiner

*Primary Examiner* — Thienvu Tran
(74) *Attorney, Agent, or Firm* — Schwegman Lundberg & Woessner, P.A.

(57) ABSTRACT

An adaptive lighting system having a detection unit by which one or more extrinsic variables, that is variables occurring outside the adaptive lighting system, can be detected and can be transmitted, preferably in the form of at least one electric signal, to an evaluation and control unit, to the evaluation and control unit by which a control signal can be generated from the transmitted extrinsic variable(s) and can be transmitted to one or more adaptive light source(s) and to the one or more adaptive light source(s) which is/are designed to vary one or more it its/their emission properties on the basis of the transmitted control signal.

8 Claims, 2 Drawing Sheets

ADAPTIVE LIGHTING SYSTEM

OVERVIEW

The present invention relates to an adaptive lighting system which has one or more light sources whose emission property or properties can be varied on the basis of variables occurring outside the adaptive lighting system (also called extrinsic variables in the following, since they do not occur within or as part of the lighting system).

The present invention furthermore also relates to a corresponding adaptive lighting method and to uses of such an adaptive lighting system and lighting method.

A frequently neglected factor, but one which is important, in the modern working world is the psychological balance which also has an influence on physical health. Emotionality is also an important factor at the workplace and also not least has an effect on performance. Light and color are ideally suitable to influence moods and thus the well-being of a person. The light color, that is the light spectrum considered from a physical aspect, has both an emotional and a biological effect on humans, above all on the inner clock of humans.

It is therefore the object of the present invention to provide an adaptive lighting system as well as a corresponding adaptive lighting method which positively influences the well-being and/or behavior of a person.

The present invention will first be described generally in the following and then with reference to an embodiment. The individual features and/or components of the exemplary adaptive lighting system in accordance with the invention realized in combination with one another in the embodiment in this respect do not have to be exactly realized in the configuration shown in the embodiment within the framework of the present invention, but can also be combined with one another in a different manner. Individual ones of the features and/or components shown can in particular also be omitted or can also be combined with other individual features and/or components in a different manner. In addition, every individual one of the features and/or components shown can already be advantageous alone per se.

The basic idea of the present invention is to realize an adaptive lighting system which makes it possible to adapt (that is to vary) the emission properties of the light sources of the adaptive lighting system on the basis of different variables which influence the well-being and/or behavior of humans (that is on the basis of extrinsic variables viewed from the lighting system) such that the light of these light sources has a positive effect on the mood and/or on the behavior of a person irradiated by this light. The system can be variable with respect to its light spectrum, its light intensity and its spatial light distribution, can also determine the psychological state of the person exposed to the light of the lighting system via different parameters to be detected (that is via the extrinsic variables) and can finally generate suitable visual stimuli on the basis of a variation of the emission properties of the adaptive light sources to have a positive influence on the condition of the person.

Physiological parameters such as the heart rate, the skin resistance or the temperature of a person can first be named as extrinsic variables which influence the condition of a person and which can be detected by suitable sensors and/or data inputs within the framework of the present invention. The term sensor and the term data input are in this respect to be understood in a very general manner within the framework of the present invention. Different sensors such as temperature sensors, pressure sensors, acceleration sensors, . . . can thus be used as sensors detecting extrinsic variables within the framework of the present invention. Different devices or systems which generate data in different manners and can transmit them to the lighting system e.g. in the form of electric signals can be used as data inputs. Such a data input can, for example, be a simple microphone picking up environmental noise. Equally, however, a complete computer system (PC) can be used as the data input, which treats different information data or information data types such as hypertext documents, e-mails, spreadsheet documents, warning message on the screen, . . . as extrinsic variables, that is which detects them (if the computer system is part of the adaptive lighting system as a data input) as extrinsic variables or (if the computer system is connected to the adaptive lighting system as an external, device) transmits these extrinsic variables to the adaptive lighting system.

In addition to the detection of physiological parameters of a person as extrinsic variables, it is a material feature of the present invention that parameters (such as the facial expressions or the gestures of a person) which characterize the emotional state of a person are also detected as extrinsic parameters (via suitable sensors such as cameras) and can be used to control the emission properties of the adaptive light sources after a suitable evaluation (e.g. with the aid of image processing algorithms).

The instantaneous condition of a person can in particular be narrowed down comparatively well in accordance with the invention on a combination of the aforesaid extrinsic variables, that is on a detection of both parameters characterizing the emotional state of a person and of physiological parameters of the person (so that the emission properties of the light sources can be controlled directly in dependence on the instantaneous condition).

The use of such multi-sensor systems (that is the use, cf. below, of both first and second sensors or sensor types for detecting extrinsic variables) can be explained with reference to the example for a work-inhibiting emotion due no annoyance at an incoming e-mail. The receipt of the e-mail can be simply recognized by a computer system as a data input of the adaptive lighting system (frames of mind of the person expressing annoyance can be detected with high accuracy e.g. by keywords such as "complaint", " . . . unsatisfactory . . . " in the e-mail in conjunction with facial expressions of the person expressing annoyance detected by a video camera (and evaluated by a corresponding facial recognition program). The adaptive lighting system in accordance with the invention can react to this annoyance by a soothing light program, that is the emission properties of the light, sources (in particular the emitted spectrum) can be varied so that soothing light is emitted. Conversely, the adaptive lighting system can also e.g. generate an activating light mood when it is found by corresponding facial recognition and evaluation of extrinsic variables characterizing the emotional state of the person, on the one hand, and the life context of the parameters relating to the person such as a specific appointment in an electronic diary of this person, on the other hand, that (with a corresponding fatigue of the person before the appointment) an activating light mood is helpful. The present invention can thus combine dynamic light with multi-sensor systems and thus ensure a type of emotional ergonomics for the person using the adaptive lighting system.

A major point of the present invention in this respect is that feelings of the person can also be taken into consideration and the emission situation or light situation provided by the adaptive lighting system can be adapted to these emotions. Since in particular the light color has a significant effect on feelings, suitable color combinations can be generated to improve the emotional ergonomics of the users of the lighting system in accordance with the invention.

(Reference is made for this purpose, for example, to the book "Das Farbwörterbuch" [The Color Dictionary] by Mr. Axel Venn which shows that specific color combinations can produce specific emotions: In a survey of 60 participants, 1,625 different colors were associated with 360 different feelings. Some examples, such as can be used in the adaptive lighting system in accordance with the invention, are named in the following:

Comfortable ambience: warm red-orange-yellow hues
Refreshing: yellow-green
Activating: blue
Soothing: pink.)

An adaptive lighting system in accordance with the invention includes a detection unit, an evaluation and control unit and one or more adaptive light sources. The detection unit and the evaluation and control unit can be formed in hardware or in software and thus therefore be realized e.g. as programs in the memory of a computer system (PC) of the adaptive lighting system which is designed for controlling the adaptive light source(s). The extrinsic variables, that is the variables occurring outside the adaptive lighting system can be detected using the detection unit. They can then be transmitted, preferably in the form of one or more electric signals, to the evaluation and control unit. An optical data transmission is naturally also possible. The evaluation and control unit generates a control signal which is transmitted to the light source(s) from the transmitted extrinsic variables in dependence on the type of the respective extrinsic variable. A plurality of different control signals can naturally also be transmitted to the light sources. For example, the facial expressions of a person can thus be detected as extrinsic variables by means of a video camera, can be evaluated by means of suitable image processing software of the camera (or of the evaluation and control unit) for classifying the instantaneous state of mind of the person and a corresponding control signal can be generated in dependence on the category determined (e.g. "angry", "satisfied", "tired") which controls the light sources differently in dependence on the state of mind of the person. Accordingly, the adaptive light source(s) of the adaptive lighting system in accordance with the invention is/are designed to vary at least one of its/their emission properties on the basis of the transmitted control signal.

The detection unit can in this respect in a preferred embodiment have a plurality of first sensors with which a plurality of parameters characterizing the emotional state of a person can be detected as extrinsic variables or can also be connected to such sensors for detecting such parameters. Only one sensor can naturally also be provided with which only one such parameter can be detected. The parameters can, for example, be the facial expression, the gestures and/or a movement pattern of the person. Such parameters can be detected, for example, by sensors in the form of cameras, in particular video cameras. Microphones which e.g. detect loud expressions of emotion, e.g. expressions of discontent, of the person are also conceivable. The extrinsic variables thus detected which characterize the emotional state can be evaluated in different manners in the evaluation and control unit, for example by suitable image processing programs for facial recognition and/or by suitable noise and/or voice analysis programs. A suitable control signal can then be generated using the acquired results and the light source(s) can be suitably controlled by it to vary at least one of its/their emission properties (e.g. once it has been found that the person is angry, the light intensity can be damped and/or the emitted light spectrum can be switched to soothing light).

In a further advantageous embodiment, the detection unit can have a plurality of second sensors with which physiological parameters of the person can be detected as extrinsic variables (in particular: can be measured in a predefined manner depending on the sensor type) or can be connected to a plurality of such second sensors for detecting the physiological variables. It is naturally also possible here only to use one second sensor with which only one physiological parameter is detected. (The term the "second" sensor here does not designate the number of sensors, but rather distinguishes those types of sensors with which the extrinsic variables characterizing the emotional state can be detected—first sensors—from those sensors with which physiological parameters can be detected.)

The physiological parameters can, for example, be the pulse, the skin resistance, the heart rate, the blood pressure and/or the temperature of the person. Correspondingly, temperature sensors, conductivity sensors, pressure sensors, . . . can accordingly be used as second sensors. A control signal can then be generated using the measured physiological parameters by suitable evaluation programs of the evaluation and control unit (e.g. programs which quantify the blood pressure measured by a blood pressure sensor and switch the light spectrum to soothing light for a longer period the higher said blood pressure is or programs which quantify the measured heart rate and assign it to different classes and emit different light depending on the class of the rate), said control signal including corresponding commands for the adaptive light sources to switch the emission properties thereof as desired. Such second sensors determining physiological parameters of the person can in particular be connected to the evaluation and control unit of the adaptive lighting system via Bluetooth connections. However, wired connections from the second sensors of the lighting system to the evaluation and control unit thereof are naturally also possible.

It is particularly preferred to combine the two above-described embodiments with one another, that is to detect both parameters characterizing the emotional state of the person and physiological parameters of the same person as extrinsic variables via the detection unit, to evaluate them in the evaluation and control unit by suitable programs or program parts and to generate the desired control signals for the adaptive light sources therefrom and to transmit them to the latter.

In a further preferred embodiment (which can likewise be combined with the aforesaid embodiments, but can also stand alone as a separate embodiment), the detection unit can have a plurality of data inputs with which the life context of the parameters relating to the person (in particular: semantic parameters) can be detected as extrinsic variables. (It is naturally also possible here to design the data inputs as separate units to which the detection unit can be connected and/or only to provide a corresponding data input with which only one respective parameter can be detected.) For example, such parameters relating to the life context can be semantic parameters such as text messages (e-mails or SMS) directed to the person or also information from an electronic diary. Non-semantic parameters such as acoustic or visual signal information (for example the ringing or vibrating of a telephone or cellular phone of the person or warning messages displayed on the screen or similar) can also be detected as extrinsic parameters via corresponding data inputs. As already described, the term of data input is defined as very wide in the case of the present invention; it does not only have to be e.g. the I/O of a PC here, but can also be the whole office PC or also the company smart phone of an employee. In any case, however, parameters relating to the life context of a person are understood as chose extrinsic variables which admittedly relate to the person (e.g. e-mails addressed to this person), but which cannot be understood as physiological parameters of the person and which also do not directly characterize the emotional state of the person (that is can only influence them indirectly).

For example, text of incoming e-mails can be searched for predefined keywords such as "urgent", "rush", "angry", "disappointed", "intolerable", . . . , which are highly likely to be emotionally charged for the employee, using the office PC of an employee as a data input of the detection unit of the adaptive lighting system by means of a suitable text analysis system. The keywords can in this respect be divided into classes with which a (likely or presumed) emotional state of the person is associated. Corresponding control information for the adaptive light sources can then be associated with these emotional states or state classes so that, on locating corresponding keywords in e-mails directed to the employee, ultimately a suitable control signal for the light sources can be generated via the associated emotional class which thereupon switch their emission properties suitably (e.g. toward more soothing light). It is thus accordingly possible, e.g. by means of a predefined threshold value, to react to the exceeding of a specific number of appointments per time unit in the employee's electronic diary through suitable light emission. It is equally conceivable to detect the number of incoming telephone calls per time unit and to vary the emission properties of the adaptive light sources accordingly by a suitable control signal.

Finally, it is also possible to provide a plurality of second data inputs in the detection unit by which parameters relating to the environment can be detected as extrinsic variables. (Here, too, "two" does not designate the number of such data inputs, but rather the differentiation to the above-described "first" (types of) data inputs. Only one corresponding second data input can naturally also be provided here with which only one parameter can be detected. The second data inputs can in this respect be used in combination with she above-described embodiments.) Such parameters relating to the environment can in particular be the environmental temperature, the air pressure, the humidity and/or the environmental light intensity. In contrast to the first data inputs, the second data inputs thus detect such parameters or values which do not depend on the respective person and which can typically also not be influenced by him. Corresponding sensors, e.g. for detecting the humidity or the instantaneous environmental, brightness, are known. The detected parameters can be classified by the evaluation and control unit (e.g. into different brightness intervals or environmental brightness): depending on the instantaneously present class, a suitable control signal can be generated and transmitted to the light sources and the latter can finally vary their emission properties in accordance with the control signal.

In a particularly preferred variant, the detection unit of the lighting system in accordance with the invention includes first sensors, second sensors, first data inputs and second data inputs and can thus detect and evaluate the emotional state of a user of the adaptive lighting system, physiological parameters of this user, parameters relating to the life context of this user and parameters relating to the environment with the goal of a suitable adaptation of the emission properties of the adaptive light sources.

The emission properties of the adaptive light sources can be the emission spectrum, the color temperature, the emitted color, the irradiated intensity and/or the time distribution of the irradiated light, of one, more or all of these light sources. If the adaptive lighting system has a plurality of light sources, the aforesaid emission properties can therefore be varied individually or in any desired combination in only individual ones of these light sources or also in all light, sources simultaneously. Suitable control mechanisms in this respect depend on the type of the light sources used and are familiar to the skilled person.

A plurality of adaptive light sources can in particular be used which each have different emission spectra (e.g. a plurality of differently emitting light-emission diodes (LEDs), e.g. in the blue, in the green and in the red). The individual light sources can in this respect be controlled individually from one another for varying their emission properties.

In a further preferred embodiment, the adaptive lighting system is designed so that a plurality of different extrinsic variables can be detected at different points in time. One and the same extrinsic variable can also be used at respectively different points in time. The control signal can then be generated while taking account of the different detection times, that is can take account of which variable values are present for the individual extrinsic variables at which points in time following one another. Accordingly, time developments in the value of the extrinsic variables can be taken into account.

The control of the adaptive light source(s) preferably takes place by predefined light programs stored in a memory (of the light source(s) itself/themselves or also of the evaluation and control unit). The light programs in this respect define the time development of the emission properties of the corresponding light source(s), e.g. over predefined time intervals of several hours. For example, it can be determined with such a light program that the light spectrum which is irradiated by all adaptive light sources of the lighting system in total is first selected such that it has a soothing effect for some hours before the spectral properties of individual lamps are varied so chat an activating emission spectrum results by all lamps in total for several hours.

The adaptive lighting system can thus be designed so that a predefined light program is selected from a set of available light programs by the evaluation and control unit on the basis of the detected extrinsic variables and/or of the detection times thereof after a suitable evaluation (e.g. of the quantitative change in the extrinsic variables or of parameters characterizing these variables over a predefined time interval. The corresponding selection can then be transmitted to the adaptive light sources with the aid of the control signal so that they can adapt their emission properties in accordance with the selected program. In this case, the light, programs are thus fixedly predefined.

Alternatively to this (or also in combination therewith), light programs can also be provided whose development can be variably designed by individual program parameters. In this case, it is possible to determine the program parameters determining the time development of the light programs using the evaluation and control unit on the basis of the detected extrinsic values and/or of the detection times thereof. The program parameters can then be transmitted, e.g. by means of the control signal, from the evaluation and control unit to the light sources so that the latter receive all the required parameters at the start of the corresponding light program.

It is possible in accordance with the invention that the light program selections made over a predefined time period (for example some hours or even days) and/or specific program parameters are detected and recorded (for example in a memory of the evaluation and control unit). Respective changes in the detected extrinsic variables over this time period can equally be determined and stored. It can then be determined by means of this stored information whether there is a correlation between the different light programs selected after one another over the predefined time period and/or the program parameters fixed after one another, on the one hand, and the variations in the detected extrinsic variables, on the other hand. If this is the case, that is if there is such a correlation, this can be evaluated and the selection of the light programs and/or program parameters can be made while taking this correlation into account for the future.

The evaluation and control unit can preferably include an artificial neuronal network for generating the control signal from the transmitted extrinsic variable(s). The prescribed correlation can in particular be determined with the aid of this neuronal network.

The adaptive light sources can be organic light-emitting diodes, OLEDs, in particular predefined spatial arrangements of a plurality of such organic light-emitting diodes. It is equally possible to use inorganic light-emitting diodes, LEDs, preferably in the form of a spatial arrangement of a plurality of individual LEDs. The OLEDs and/or LEDS can in this respect be controlled individually and can be varied individually with respect to their emission properties by the control signal. Spatial arrangements which comprise a plurality of individual OLEDs and LEDs can also be used as adaptive light sources of the present invention.

An adaptive lighting method in accordance with the invention serves the controlling of an adaptive light system such as has been described above. One or more extrinsic variables are detected in this process. The control signal is calculated from the detected extrinsic variable(s) and is transmitted to one or more light sources. At least one emission property in at least one of the adaptive light sources is varied on the basis of the transmitted control signal.

Uses in accordance with the invention of an adaptive lighting system or of an adaptive lighting method include the light control at the workplace, in particular at an office workplace.

The present invention thus results in an adaptive lighting system which not only allows a substantially better adaptation to the current situation of the user due to the taking into account of a plurality of detected extrinsic variables (also simply called parameters in the following) of different categories, but can also have a positive effect on his mood in a proactive manner.

The extrinsic variables or the parameters can in this respect also be divided into the following categories:

Physiological parameters: These include the pulse, skin conductance, body temperature, . . . , These parameters can be measured by relatively simple, commercial sensors (the second sensors).

Psychological parameters: The facial expressions of the user can here, for example, be detected by a camera and evaluated by means of real-time image processing software. The image processing software delivers a feature vector which includes a respective normed floating point value e.g. for the characteristics "angry", "happy", "sad", "surprised", . . . of the parameter or of the extrinsic variable. The opening and closing of both eyes can equally be taken into account by means of a binary value in the extrinsic variable of facial expressions. Movement patterns of a person and the gestures of a person can e.g. also be detected as extrinsic variables by corresponding shots of a video camera as the first sensor. A three-dimensional detection system such as the Microsoft Kinect camera can be used for detecting the gestures. In this respect, behavior patterns can be derived from the facial expressions and from the gestures in accordance with the invention.

Semantic parameters: They can be, for example, context information on the e-mails directed to a user or information from his diary. This information differs from the first two categories in that it is available under certain circumstances before it reaches the user or he becomes aware of it so that a proactive influencing of the emission properties of the adaptive lighting system is possible by detection of these extrinsic variables.

Environmental parameters: These include parameters such as the weather and the season which can usually be acquired from existing data sources.

The combining of different types of extrinsic variables or parameters available at different times ("sensor fusion") and their evaluation for controlling the emission properties of the adaptive lighting system thus form a material feature of the present invention. Said adaptive lighting system preferably includes a plurality of separately controllable light sources each having different spectral ranges. The light sources can in this respect be combined into one or more lamps (individual light sources can be contained in individual illuminants; it is equally possible that the individual light sources are combined in one or more illuminants).

The adaptive lighting system in accordance with the invention can be understood as a feedback loop having a complex command variable (=desired variable) which is composed of the above-described parameters or extrinsic variables. The desired variable "emotional ergonomics" is observed when all the parameters are within respectively defined ranges. In this manner of observation, the semantic parameters and the environmental parameters can also be understood as disturbance variables which can, however, even be detected before the occurrence of their effect on the regulation path in time.

The evaluation and control unit of the lighting system in accordance with the invention can map an n-dimensional space of input, parameters (extrinsic variables) onto an m-dimensional space of light parameters (e.g. the light programs). In this respect, the connection of a plurality of extrinsic variables of different categories (e.g. of extrinsic variables relating to the emotional state of a person to extrinsic variables which reproduce the physiological state of the person) is of particular importance. If, for example, an angry user is recognized via the image evaluation of the facial expressions, it may not yet be able to be found with sufficient certainty that the user is actually angry and if so, why he is angry and whether the lighting system should generate a soothing scenario. The system can now be set so that a soothing light is only irradiated when the anger can also additionally be determined with high certainty by an increased blood pressure, an increased heart rate and/or cold hands. In addition, the certainty of the detection of the correct state can be optimized by a further analysis of semantic parameters, that is e.g. of a received e-mail with specific keywords and sentence modules (e.g. " . . . not satisfactory . . . ", . . . , can no longer . . . ") and/or of the diary (e.g. "appointment with director"). The light can, for example, be lighter, bluer and static (that is can be varied in three emission properties). Six input parameters (image evaluation of the facial expression, blood pressure, heart rate, cold hands, e-mail analysis and diary analysis) are then mapped to three emission properties (the emission properties can thus be considered light parameters). The bright light has a mood-brightening effect and the blue portion has a psychologically soothing effect, but is physiologically awakening, so that the user goes to the appointment with the director in a calm, but alert state.

The light parameters can also be discrete light programs which can be each applied to one or more light sources of the system by the evaluation and control unit via the control signal in a time control. It is thus possible that the predefined light programs are fixed such that they are not varied by the input parameter, but are rather only selected in dependence on the input parameters. Alternatively to this or in combination therewith, it is, however, also possible that the light, parameters directly determine the states of the individual light sources of the system so that a direct coupling is associated between the input parameters and the presented lighting. Unlike the case of the predefined and fixed light programs, a transmission function is used here which maps the input parameters directly to the states of the individual light sources. This transmission function can also contain a time response characteristic (e.g. delayed reaction to variations in the input parameters). The evaluation and control unit can observe a correlation between the light programs, on the one hand, and observed variations in the input parameters or in the extrinsic variables, on the other hand, over long time periods (e.g. several hours to several days) and can thereupon adapt the transmission function (teachable evaluation and control unit). For this purpose, a previously individually determined desired value range of the input parameters can be defined for a specific transmission function and the input parameters detected over the observation time period can be compared therewith. An adaptation of the transmission function takes place when the input parameters do not return into the desired value range within a defined time interval, on a use of the light program. The adaptation of the transmission function can include the adaptation of the light intensity, of the light spectrum and of the time development of these two variables.

An advantage of the present invention in particular comprises the fact that the environmental light does not only adapt ideally to the user, but that his mood can be directly positively influenced. This can take place both reactively (by evaluation of the physiological, and psychological parameters) and proactively (by evaluation of the semantic parameters).

The main area of use of the present invention relates to office workplaces. Furthermore, the present invention can, however, also be used in hospitals for the faster and better recovery of patients. Uses in the home sector are equally conceivable.

DETAILED DESCRIPTION

Figure 1:
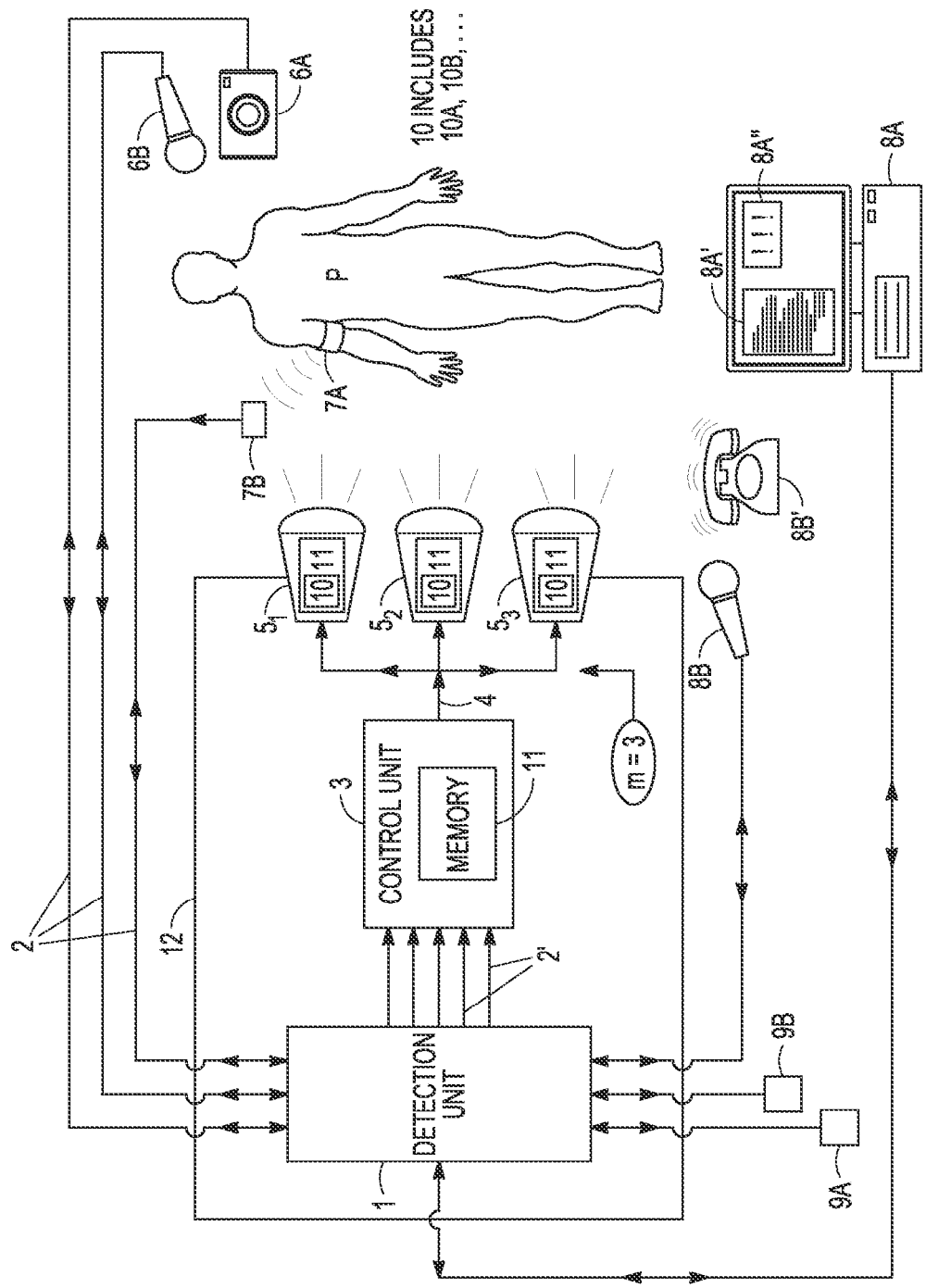
FIG. 1 the setup of an exemplary adaptive lighting system in accordance with the invention.

FIG. 1 shows an adaptive lighting system which is realized in the form of a microcontroller 12 controlling a plurality of light sources 5. The microcontroller includes the detection unit 1 as well as the evaluation and control unit 3 of the adaptive lighting system. The evaluation and control unit 3 has a program memory 11 in this respect.

The following units are respectively electrically connected to the detection unit 1 via bidirectional data lines for transmitting extrinsic variables 2 to the detection unit 1 and for controlling the units described in the following by the detection unit 1: Two first sensors in the form of a video camera 6a and of a microphone 6b, a second sensor 7a, 7b, which transmits the blood pressure of a person P to a receiver 7b connected to the detection unit 1 via a bidirectional data line by means of Bluetooth via a blood pressure cuff 7a, a first data input 8b likewise in the form of a microphone (which is positioned so that it can detect the ringing of a telephone 8b of the person P), a further first data input in the form of an office PC 8a of the person P and two second data inputs in the form of a temperature sensor 9a for measuring the office temperature of the office of the person P and of a humidity sensor 9b for detecting the humidity in this office.

The detection unit 1 is connected to the evaluation and control unit 3 by means of electric data lines for transmitting the received extrinsic variables in the form of electric signals 2'. A microprocessor of the evaluation and control unit 3 generates the control signal 4 on the basis of corresponding evaluation and control programs stored in the memory 11 with reference to the individual detected extrinsic variables 2. Said control signal is transmitted via a suitable data line to here n=3 adaptive light sources $5_1$, $5_2$ and $5_3$. The control signal 4 can in this respect inter alia transmit selection or control parameters for light programs 10a, 10b, ... stored in memories 11 of the light sources $5_1$ to $5_3$. The light programs 10a, 10b, ... can in this respect respectively differently fix the light intensity of the individual light sources and the spectral composition of the individual light sources.

The blood pressure of the person P (via the elements 7a, 7b), the facial expressions of the person P (via the video camera 6a), voice expressions of the person P (via the microphone 6b and via a suitable language analysis software in the evaluation and control unit 3), the environmental temperature (via the data input sensor 9a), the environmental humidity (via the data input sensor 9b), a possible ringing of the office telephone 9b (via the microphone 9b) and e-mails 8a' incoming via the office PC 8a or warning messages 8a" displayed on the screen of the office PC 8a can thus be detected as extrinsic variables by the detection unit 1 with the aid of the configuration shown, can be evaluated via the evaluation and control unit 3 and can be used in the form of the control signal 4 for the suitable control of the three light sources $5_1$ to $5_3$.

Figure 2:
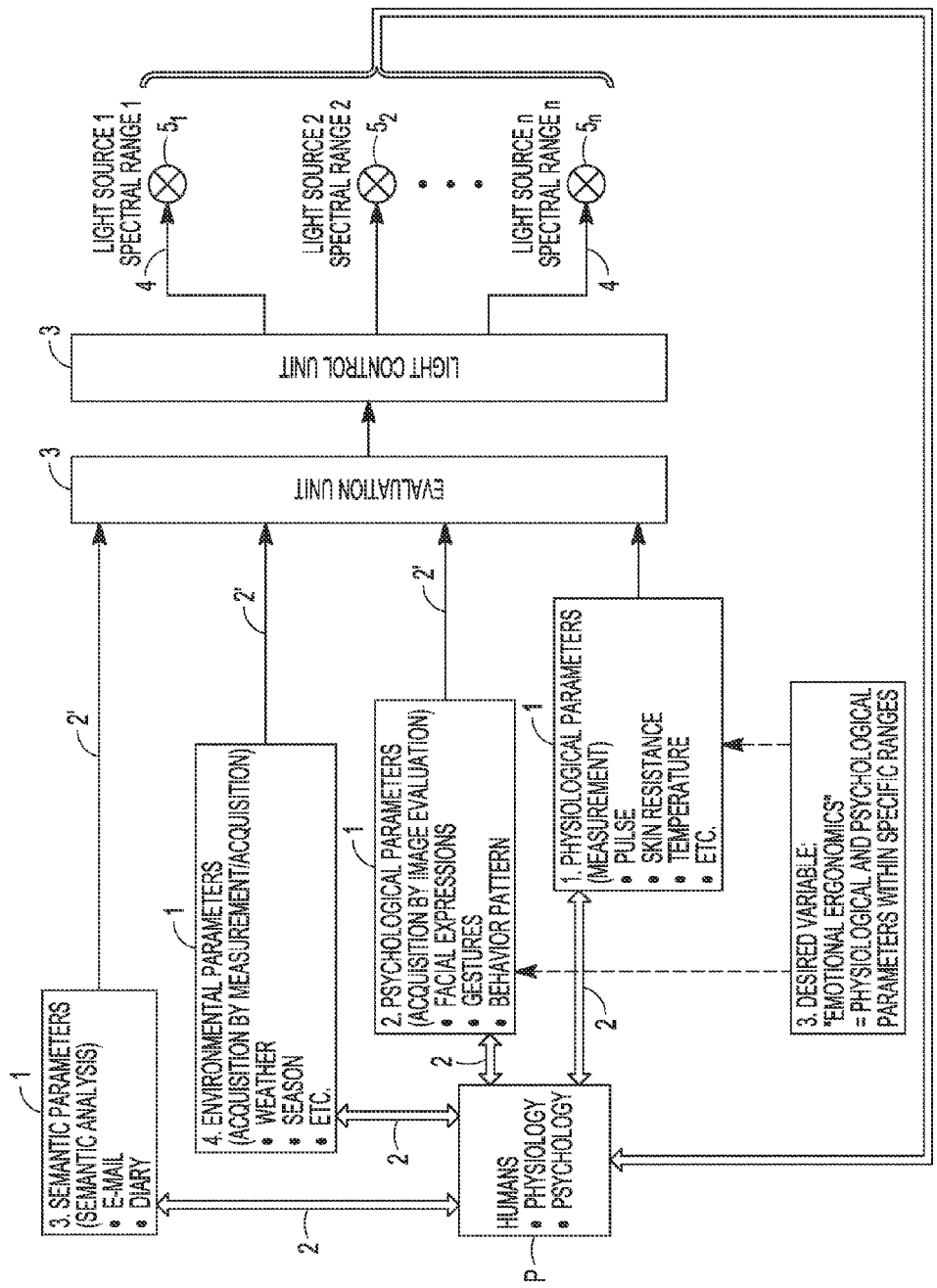
FIG. 2 a diagram for the processing of the extrinsic variables in the setup of FIG. 1.

FIG. 2 outlines the flow of information in the setup shown in FIG. 1.

The invention claimed is:

1. An adapting lighting system, comprising:
    a detection unit configured to detect one or more extrinsic variables occurring outside the adaptive lighting system, wherein the detection unit includes one or more of:
        one or more first sensors configured to detect one or more parameters including: an emotional state of a person, facial expressions, gestures, or a movement pattern of the person, or an emotional state of the person, as the one or more extrinsic variables;
        one or more second sensors configured to detect one or more physiological parameters of a person, including at least one of: pulse, skin resistance, heart rate, blood pressure or temperature, as the one or more extrinsic variables;
        one or more first data inputs by which one or more parameters can be detected as one or more extrinsic variables, the one or more parameters relating to a life context of a person, including at least one of: a text message directed to a person in the form of an e-mail or of an SMS, or information of an electronic diary of the person;
        one or more second data inputs by which one or more parameters relating to an environment, including at least one of: the temperature, the air pressure, the humidity or the environmental light intensity, is measured, as the one or more extrinsic variables; and
    an evaluation and control unit configured to generate a control signal from the extrinsic variables received from the detection unit, and transmit the control signal to one or more adaptive light sources; and
    wherein the one or more adaptive light sources is configured to vary an emission property on the basis of the control signal;

wherein a plurality of predefined light programs are stored in a memory of the evaluation and control unit, or of the adaptive light for the time-dependent controlling of the emission property of the adaptive light sources;

wherein one or more of the predefined light programs is capable of being selected on the basis of the detected extrinsic variable(s) or of the detection time(s) of the detected extrinsic variable(s) by the evaluation and control unit, wherein the selection of the adaptive light sources is transmitted by the control signal; and wherein a plurality of light program selections or program parameter determinations made over a first predefined time period, are stored;

wherein respective variations in the detected extrinsic variables are determined over a second predefined time period preferably corresponding to the first predefined time period and stored;

wherein it is determined from the stored information whether there is a correlation between the light program selections made or the program parameters determined, and the variations in the detected extrinsic variable(s); and wherein if there is such a correlation, a renewed selection of the light program(s) or determination of the program parameter(s) is made while taking account of this correlation.

2. The adaptive lighting system of claim 1, wherein extrinsic variables are detected using at least two of
the first sensor(s);
the second sensor(s);
the first data input(s);
the second data input(s),
such that the control signal is generated from these detected extrinsic values and is transmitted to the adaptive light sources; and
wherein the adaptive light sources designed to vary the emission property in response to the control signal.

3. The adaptive lighting system of claim 1, wherein the emission property to be varied of the one or more adaptive light sources includes one or more of the properties named in the following, with them relating to the light emitted overall by an individual one of the light sources, by a plurality of the light sources or by all light sources: the emission spectrum, the color temperature, the color, the intensity or the spatial distribution or time distribution.

4. The adaptive lighting system of claim 1, wherein a plurality of adaptive light sources each have different emission spectra, and are controllable independently of one another.

5. The adaptive lighting system of claim 1, wherein a plurality of different extrinsic variables is detected at different times;
wherein that one and the same extrinsic variable is detected at different times; and
wherein that the control signal is generated while taking account of different detection times.

6. The adaptive lighting system of claim 1, wherein a plurality of predefined light programs are stored in a memory of the evaluation and control unit, or of the adaptive light for the time-dependent controlling of the emission property of the adaptive sources, wherein one or more of the program parameters determining the time development of at least one of the predefined light programs is determined on the basis of the detected extrinsic variable(s) or of the detection time(s) of the detected extrinsic variable(s) by the evaluation and control unit, wherein these program parameters are transmitted to the adaptive light by the control signal.

7. The adaptive lighting system of claim 1, wherein the evaluation and control unit includes an artificial neuronal network for generating the control signal from the transmitted extrinsic variable(s).

8. The adaptive lighting system claim 1, wherein the one or more adaptive light source(s) include at least one organic light-emitting diode (OLED), at least one inorganic light-emitting diode (LED), or a spatial arrangement of OLEDs and LEDs.

* * * * *